Nov. 8, 1932.  A. SHARP ET AL  1,887,046
CUTTING AND BLOCK FORMING MACHINE FOR PLASTIC SUBSTANCES
Filed March 28, 1930  2 Sheets-Sheet 2
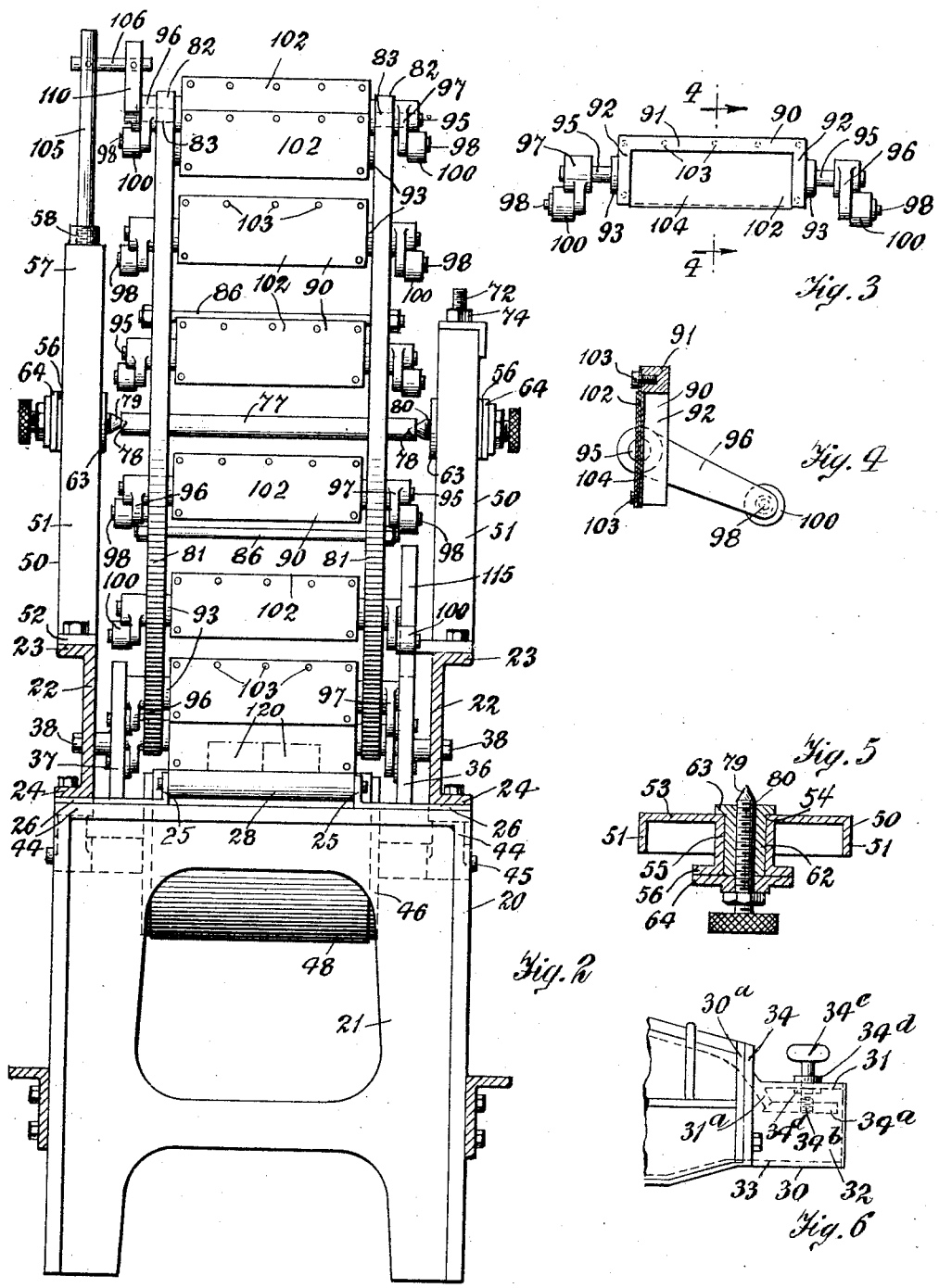
INVENTOR
ALBERT SHARP
AND
BY GEORGE SHARP
ATTORNEY Patented Nov. 8, 1932

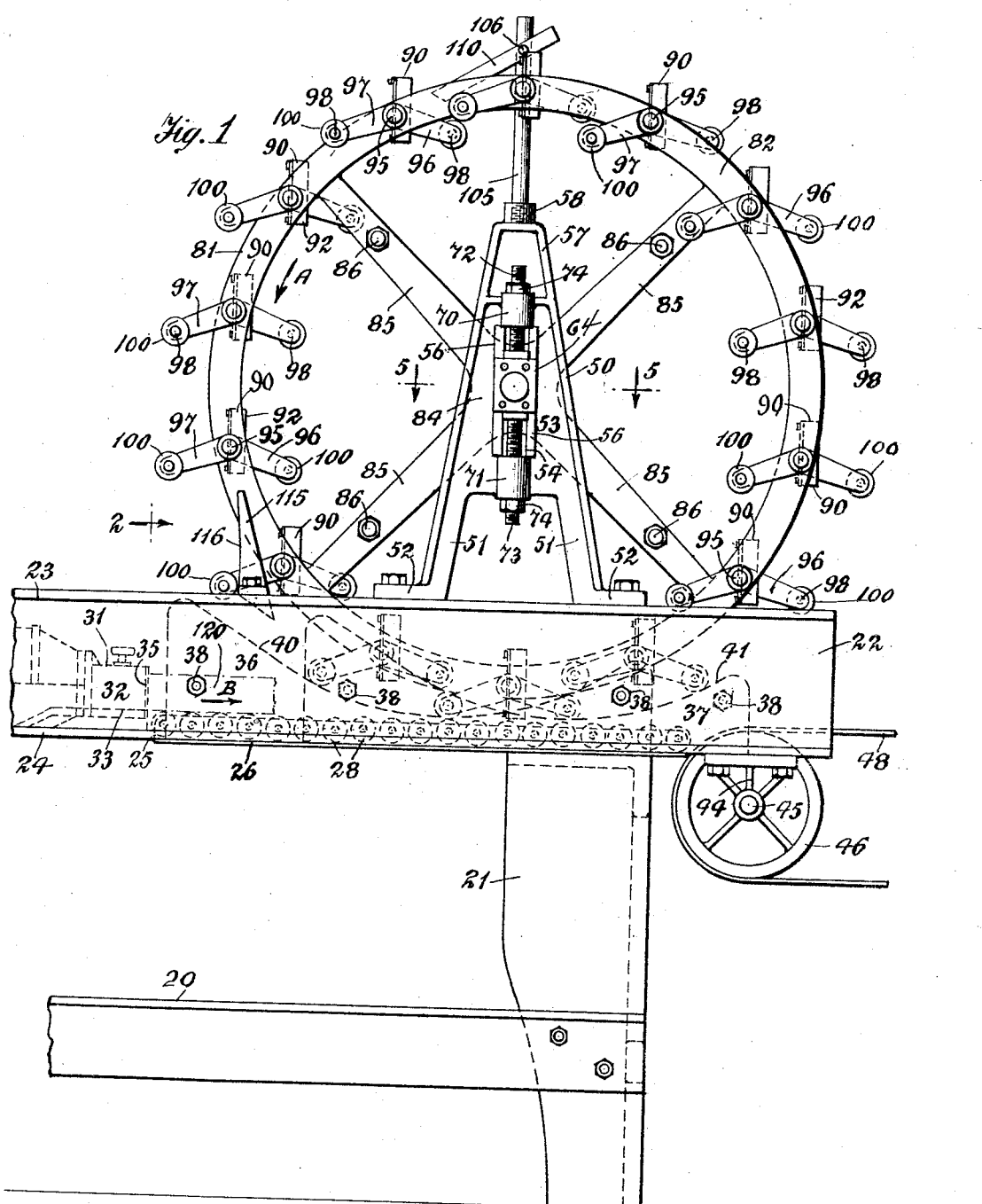

1,887,046

UNITED STATES PATENT OFFICE

ALBERT SHARP AND GEORGE SHARP, OF BAYONNE, NEW JERSEY

CUTTING AND BLOCK FORMING MACHINE FOR PLASTIC SUBSTANCES

Application filed March 28, 1930. Serial No. 439,707.

This invention relates to a cutting and block forming machine for plastic substances.

The present invention is an improvement of our invention described in our patent application filed December 27, 1929, bearing serial number 416,800.

The object of the invention is the production of a machine, by which plastic substances of various kinds can be easily cut and formed into blocks of the same and uniform size. The second object of the invention is the production of a machine for forming blocks of plastic materials, in which the adjacent outer surfaces thereof will be at right angles to each other. The third object is the production of a machine where the cutting elements thereof are automatically moved to vertical planes when inclined thereto and maintained in such planes. The fourth object of the invention is the production of a cutting and block forming machine in which the substances operated upon drive the moving elements of the machine. The fifth object of the invention is the production of means whereby the substances operated upon can be made of different thicknesses to produce blocks of uniform predetermined weights.

In the accompanying drawings Fig. 1 represents a side elevation of the improved cutting and block forming machine, Fig. 2 shows a side view and section of Fig. 1 on the line 2, 2; Fig. 3 indicates an elevation of a detail; Fig. 4 is a section of Fig. 3 on the line 4, 4; Fig. 5 shows an enlarged section of Fig. 1 on the line 5, 5 and Fig. 6 shows a fragmentary portion of Fig. 1.

The butter cutting and block forming machine in this exemplification comprises the supporting table designated in its entirety by the numeral 20. The said table comprises legs 21 of which one is shown, and to which are bolted the channel shaped longitudinal side members 22 having the top flanges 23 and the bottom flanges 24. Journal brackets are indicated having each the vertical leg 25 and the horizontal leg 26. The latter legs are interposed between the top faces of the legs 21 and the lower faces of the flanges 24. A plurality of supporting rollers 28 have their ends journaled in the vertical legs 25. The numeral 30 indicates the outlet nozzle of a butter kneading machine similar to the one described in our United States Letters Patent for Kneading machine, No. 1,499,790, dated July 1st, 1924. The said outlet nozzle 30 is indicated having the top wall 31, the side walls 32, the bottom wall 33 and the flange 34. A cutting wire 35 extends vertically across the outlet opening of said outlet nozzle 30. The flange 34 is bolted to the flange 30$^a$ of the kneading machine, in which the substances operated upon are prepared for cutting and forming them into blocks of the correct size and weight.

A projection 31$^a$ extends from the top wall 31 of the nozzle. An adjuster 34$^a$ is located in the nozzle. The said adjuster is of the same width as the inner width of the nozzle. An adjusting screw 34$^b$ has formed at its upper end the operating disc 34$^c$ and its lower end is in threaded engagement with the adjuster 34$^a$. A pair of collars 34$^d$ extend from the screw 34$^b$. The adjuster can be located at different levels and thereby the thickness of the substances discharged from the outlet of the nozzle can be varied to obtain the desired weights of the blocks formed by the machine.

A pair of guide track plates 36 and 37 are spaced from and bolted to the longitudinal side members 22 by means of the spacer bolts 36. The guide track plate 36 has formed therewith the curved guide edge 40 and the guide track plate 37 has formed therewith the curved guide edge 41. The guide track plate 37 is spaced forwardly from the guide track plate 36. A pair of journal brackets 44 are bolted to the lower face of each of the flanges 24 and have journaled therein the axle 45 of a conveyer drum 46. A conveyer belt 48 has one end supported on the drum 46 while its other end is supported on a drum, not shown. The top face of the upper member of the conveyer belt 48 is in the same horizontal plane as a plane tangent to the upper portions of the rollers 28, and the top face of the bottom wall 33 of the outlet nozzle 30 is in the same plane.

To the top faces of the flanges 23 are bolted a pair of V shaped journal brackets 50. Each of the brackets 50 comprises the angle shaped inclined members 51 that have formed therewith at their lower ends the feet 52. A web 53 connects the members 51. The said web has formed therewith the opening 54 and the guide brackets 55 having the front flanges 56. An extension 57 extends from the top end of one of the V shaped brackets 50 and has formed therewith the threaded boss 58. A cross head 62 having the inner flange 63 is guided in each of the openings 54 and between the guide brackets 55. A front plate 64 is bolted to each cross head 62 and bears against the flanges 56.

A pair of threaded bosses 70 and 71 are formed with each of the webs 53. A screw 72 is in threaded engagement with the boss 70 and a screw 73 is in threaded engagement with the boss 71. A jam nut 74 is provided for each of said screws. The adjacent ends of each pair of said screws 72 and 73 bear against the horizontal faces of the cross heads 62.

A rotatable cutter frame comprises the axle 77, which at its ends has formed therewith the tapered bearings 78, which engage the tapered ends 79 of the screw spindles 80 that are in engagement with threaded openings in the cross heads 62. The axle 77 has fastened thereto the supporting wheels 81, which each comprise the rim 82 having the openings 83, the hub 84 and the spokes 85. The spokes 85 are connected by the spacer bolts 86.

To and between the rims 82 of the supporting wheels are pivoted a plurality of knife holders, each of which latter is designated in its entirety by the numeral 90. Each of said holders comprises the U shaped frame having the longitudinal upper member 91 and the depending members 92. Bosses 93 extend from the members 92 and from the latter extend the pivots 95 which are supported in the openings 83 of the rims 82. Similar controlling arms 96 and 97 are fastened to the pivots 95. The arms 96 and 97 oppositely incline from the pivots 95 on the opposite sides of the knife holder. From the outer ends of the arms 96 and 97 extend the pivots 98 and to the latter are journaled the guide rollers 100. To the U shaped frames of each knife holder 90 is fastened a knife blade 102 by means of the screws 103. A cover 104 of wax paper may be fastened to each knife blade 102 by means of the screws 103, see Fig. 4.

From the extension 57 of one of the V shaped journal brackets 50 extends the post 105. The lower end of the post 105 is in threaded engagement with the boss 58. A horizontal pin 106 has one end fastened to the post 105, and to the pin 106 is fastened the adjuster arm 110. The said adjuster arm 110 is in line with the guide rollers 100 of the controlling arms 96.

To the top flange 23 of one of the channel shaped longitudinal side members 22 is bolted the adjuster bracket 115 having a curved edge 116. The bracket 115 is positioned on the other side of the supporting wheels in relation to the post 105. The said adjuster bracket 115 is in line with the guide rollers 100 of the controlling arms 97.

The said adjuster arm 110 and the adjuster bracket 115 constitutes supplemental means to move the knife holders 90, to locate the knife blades 102 to vertical planes.

To operate the cutting and block forming machine, the plastic substance, such as butter and the like, to be operated upon is discharged from the outlet nozzle 30 of a kneading machine and the like. The said substance is discharged from the outlet nozzle of the required thickness, by locating the adjusted 34$^a$ at the proper level. The said substance in this instance is divided in two portions, both designated 120, by means of the cutting wire 35. The said portions 120 first contact with one of the knife blades 102 and thereby the rotatable cutter frame having the axle 77 begins to turn in the direction of the arrow A. When the next succeeding knife blade 102 descends to the top face of the said portions 120 its cutting edge at its lower end enters the said portions 120, lowers and severs the same, and pushes the portions of the material operated upon in front thereof in the direction of the arrow B. When the cutter blades reach their lowest positions, the portions 120 are severed into blocks. After the knife blades have arrived at the lowest positions they begin to rise and move horizontally behind the substance cut at their maximum speed, which is greater than the speed given the mass of the substance operated upon by the next succeeding cutter blade 102, which has already entered the portions 120. By this means the forward cutter blade 120 which has already severed said portion 120, so to say, runs away from the cut made and leaves the said cut in the substance with a smooth face perpendicular to the longitudinal axis of the portions 120. The knife blades 102 are normally maintained in vertical planes by means of gravity through the controlling arms 96 and 97 with their guide rollers 100. Should the said knife blades 102 diverge from their vertical positions, and when leaning in one direction the adjuster arm 110 contacts with the guide rollers 100 on one side of the knife holders 90, to move them into proper positions in vertical planes. Should the knife blades 102 diverge from their vertical planes and lean in the opposite direction, the adjuster bracket 115 having the curved edge 116 contacts with the guide rollers 100 on the opposite side of the knife holders 90, to move them into proper positions bringing the knife blades 102 into vertical planes. While the knife holders 90 are approaching and leaving the portions 120, the guide rollers 100 contact with the curved guide edges 40 and 41 of the guide track plates 36 and 37, which maintain the knife blades 102 in vertical planes. After the portions 120 have been cut into blocks they are pushed upon the conveyer belt 48 which carries them away.

By means of the screws 72 and 73, the rotatable cutter frame, having the axle 77, can be raised or lowered to locate the knife blades 102 in proper position.

The covers 104 of wax paper prevent the substance operated upon from adhering to the knife blades 102. The said paper does not have to be wax paper, but other and various kinds of paper may be used.

Various modifications may be made in the invention and the present exemplification is to be taken as illustrative and not limitative thereof.

Having described our invention what we desire to secure by Letters Patent and claim is:

In a cutting and block forming machine of the character described the combination of a rotatable cutter frame comprising a pair of supporting wheels rotating together, a plurality of knife holders pivoted to and between said wheels, a knife blade supported in each holder, the parts of each knife holder disposed to normally maintain its knife blade in a vertical plane by gravity, an adjuster arm supported adjacent to one of said wheels to contact with one side of any of said holders and an adjusted bracket supported adjacent to the other wheel to contact with the other side of any of the holders, the said adjuster arm and adjuster bracket functioning to locate said knife blades in vertical planes.

Signed at Bayonne, in the county of Hudson and State of New Jersey this fifth day of March A. D. 1930.

ALBERT SHARP.
GEORGE SHARP.